(12) United States Patent
Nagayama et al.

(10) Patent No.: US 9,163,874 B2
(45) Date of Patent: Oct. 20, 2015

(54) APPARATUS FOR UNBINDING A MASS OF MUTUALLY STICKED NOODLES

(75) Inventors: Yoshiaki Nagayama, Gunma (JP); Nozomu Ishida, Gunma (JP)

(73) Assignee: SANYO FOODS CO., LTD., Tokyo (JP)

( * ) Notice: Subject to any disclaimer, the term of this patent is extended or adjusted under 35 U.S.C. 154(b) by 828 days.

(21) Appl. No.: 13/230,279

(22) Filed: Sep. 12, 2011

(65) Prior Publication Data

US 2012/0060702 A1 Mar. 15, 2012

(30) Foreign Application Priority Data

Sep. 10, 2010 (WO) .................. PCT/JP2010/065591
Jan. 17, 2011 (JP) .................. 2011-006803
Jan. 24, 2011 (JP) .................. 2011-011967

(51) Int. Cl.
*A23N 4/04* (2006.01)
*F26B 1/00* (2006.01)
*A21C 15/00* (2006.01)

(52) U.S. Cl.
CPC . *F26B 1/00* (2013.01); *A21C 15/00* (2013.01); *F26B 2210/06* (2013.01)

(58) Field of Classification Search
CPC ............ A21C 9/00; A21C 9/02; A21C 15/00; A23L 1/16; A23L 1/0073; F26B 1/00; F26B 2210/06; B04B 1/00; B04B 15/00; B04B 7/08; B04B 9/04
USPC ..................... 222/56; 99/537–541
See application file for complete search history.

(56) References Cited

U.S. PATENT DOCUMENTS

| | | | | |
|---|---|---|---|---|
| 960,577 | A * | 6/1910 | Nichols | 99/547 |
| 973,761 | A * | 10/1910 | Cline | 241/225 |
| 2,803,634 | A * | 8/1957 | Chayen | 554/23 |
| 3,695,448 | A * | 10/1972 | Johansson | 210/394 |
| 4,311,719 | A * | 1/1982 | Falconi | 426/557 |
| 4,699,710 | A * | 10/1987 | Williams | 209/24 |
| 4,988,528 | A * | 1/1991 | Tomoda | 426/557 |

(Continued)

FOREIGN PATENT DOCUMENTS

| | | | |
|---|---|---|---|
| GB | 1915003339 | * | 0/1915 |
| JP | 47-42553 | | 12/1972 |

(Continued)

OTHER PUBLICATIONS

International Search Report dated Nov. 9, 2010.

*Primary Examiner* — Dana Ross
*Assistant Examiner* — Brandon Harvey
(74) *Attorney, Agent, or Firm* — Holtz, Holtz, Goodman & Chick PC

(57) ABSTRACT

Within a housing, a rotating shaft extends horizontally, and curved unbinding rods are secured to the rotating shaft at diagonally opposed positions to extend in radial directions. Within the housing, an inner wall surface is arranged along a circular arc whose center is aligned with an axis of the rotating shaft and whose diameter is slightly larger than a diameter of a circle drawn by rotating tips of the unbinding rods. A portion of the inner wall surface is formed as an unbinding surface having a circular arc cross sectional shape facing the unbinding rods with a small clearance. A mass of noodles for one meal charged into the housing from the inlet is sent in the counter-clockwise direction by the unbinding rods rotated at a high speed and is hit by the unbinding rods repeatedly to perform an effective unbinding function.

16 Claims, 13 Drawing Sheets

(56) References Cited

U.S. PATENT DOCUMENTS

| | | | |
|---|---|---|---|
| 5,092,490 A * | 3/1992 | Suzuki et al. | 222/56 |
| 5,252,055 A * | 10/1993 | Mangiavacca | 425/340 |
| 5,393,217 A * | 2/1995 | Cheng | 425/185 |
| 5,411,171 A * | 5/1995 | Quirling et al. | 222/1 |
| 5,993,187 A * | 11/1999 | Manser et al. | 425/202 |
| 6,360,870 B1 * | 3/2002 | Wooldridge | 198/391 |
| 6,471,898 B1 * | 10/2002 | Barre et al. | 264/115 |
| 6,530,307 B2 * | 3/2003 | Cusenza et al. | 99/330 |
| 6,663,907 B1 * | 12/2003 | Pratolongo | 426/509 |
| 7,926,416 B2 * | 4/2011 | Battani | 99/330 |
| 2003/0124213 A1 * | 7/2003 | Ancona et al. | 425/208 |
| 2004/0069692 A1 * | 4/2004 | Wooldridge | 209/655 |

FOREIGN PATENT DOCUMENTS

| | | |
|---|---|---|
| JP | 54-44742 B1 | 12/1979 |
| JP | 55-144534 U | 10/1980 |
| JP | 1-101855 A | 4/1989 |
| JP | 1-84589 U | 6/1989 |
| JP | 4-341149 A | 11/1992 |
| JP | 2001-178387 A | 7/2001 |
| JP | 2003-9795 A | 1/2003 |
| JP | 2003-009796 A | 1/2003 |
| JP | 2009-118757 A | 6/2009 |

* cited by examiner

APPARATUS FOR UNBINDING A MASS OF MUTUALLY STICKED NOODLES

FIELD OF THE INVENTION

The present invention relates to an apparatus for unbinding effectively a mass of mutually sticked or entangled noodles which is produced by cutting steamed or boiled noodles to have a given length.

RELATED ART STATEMENT

On a mass production line for making instant noodles automatically, there have been provided two drying steps. In one drying step, a mass of noodles obtained by cutting heated noodles are folded, and in the other drying step a mass of mutually sticked noodles are unbound after cutting. These two drying steps have merits and demerits.

In the former drying step, noodles are simply folded before drying and the drying process can be carried out at a high speed, but a mass of mutually sticked noodles can not be unbound effectively. In the latter drying step, a mass of mutually sticked noodles can be effectively unbound, but a production speed is low.

In an apparatus for producing a mass of effectively unbound noodles, there is provided an unbinding step as a preparatory step before a drying step such as an oil fry drying step, a hot wind drying step and a microwave drying step. In the following Paten Documents 1-3, there are disclosed known unbinding steps for decreasing a degree of a binding condition of a mass of mutually sticked noodles, said mass of noodles being obtained through successive steps of a mixing and kneading step, a pressing step, a cutting process and a heating step with steam or hot water.

PRIOR ART DOCUMENTS

Patent Documents

[Patent Document 1] Japanese Patent Laid-open 1-101855
[Patent Document 2] Japanese Patent Publication 54-44742
[Patent Document 3] Japanese Utility Model Publication 47-42553

SUMMERY OF THE INVENTION

Problems to be Solved by the Invention

In the Patent Document 1, there is disclosed a known rotary unbinding apparatus which can be used in the above mentioned step of unbinding a mass of mutually sticked noodles. In this known unbinding apparatus there are provided two wings rotating at a high speed.

In the Patent Documents 2 and 3, there are disclosed apparatus for unbinding a mass of mutually sticked instant noodles, in which noodle hitting rods are rotated. As illustrated in FIG. 17, noodle hitting rods 2 are secured to a rotating shaft 1 such that the noodle hitting rods are aligned in an axial direction of the rotating shaft like a comb. A mass of noodles to be served for one meal is dropped into the unbinding apparatus from an upper inlet 3 together with a given amount of water, and then the mutually sticked noodles are hit against an inner wall by means of the noodle hitting rods 2. In the known apparatus, an upper inner wall surface 4 is formed to be upright and a lower inner wall surface 5 succeeding the upper inner wall surface 4 to locate below a horizontal level of the rotating shaft 1 is circularly curved, and a mass of mutually sticked noodles is forcedly unbound between the noodle hitting rods 2 and the circularly curved inner wall surface 5.

In the known noodle unbinding apparatus, a mass of mutually sticked noodles is hit against the inner wall surface 5 by means of the noodle hitting rods 2, but since a mass of mutually sticked noodles is easily dropped downward, it passes through the inner wall surface 5 within a short time period, and therefore a mass of mutually sticked noodles could not be effectively unbound.

The present invention has for its object to provide an apparatus for unbinding a mass of mutually sticked noodles in an effective manner to obtain a mass of noodles having an efficiently reduced degree of binding condition.

Means for Solving the Problems

According to the invention, an apparatus for unbinding a mass of mutually sticked noodles comprises a housing having an upper inlet and a lower outlet provided underneath the inlet, a rotating member arranged horizontally within said housing underneath said inlet and being rotated by a driving means, and a noodle unbinding member secured to said rotating member to extend in a radial direction, wherein said housing includes an unbinding inner wall surface situating from said upper inlet to a horizontal level passing through a center of said rotating member substantially along a curved surface which is close to a circle drawn by a locus of a rotating tip of said unbinding member, and at least an entrance of said unbinding inner wall surface situating near said upper inlet is situated close to said circle drawn by the locus of the rotating tip of said unbinding member such that a mass of mutually sticked noodles charged into housing from the upper inlet is unbound in a region near said entrance of the unbinding inner wall surface.

Merits of the Invention

In the noodle unbinding apparatus according to the invention, a mass of mutually sticked noodles obtained by cutting steamed or boiled noodles to have a given length can be effectively unbound by a cooperation of the unbinding member and the unbinding inner wall surface. In this manner, a mass of noodles having an efficiently reduced degree of binding condition can be obtained.

DESCRIPTION OF THE PREFERRED EMBODIMENTS

Embodiment 1

Figure 1:
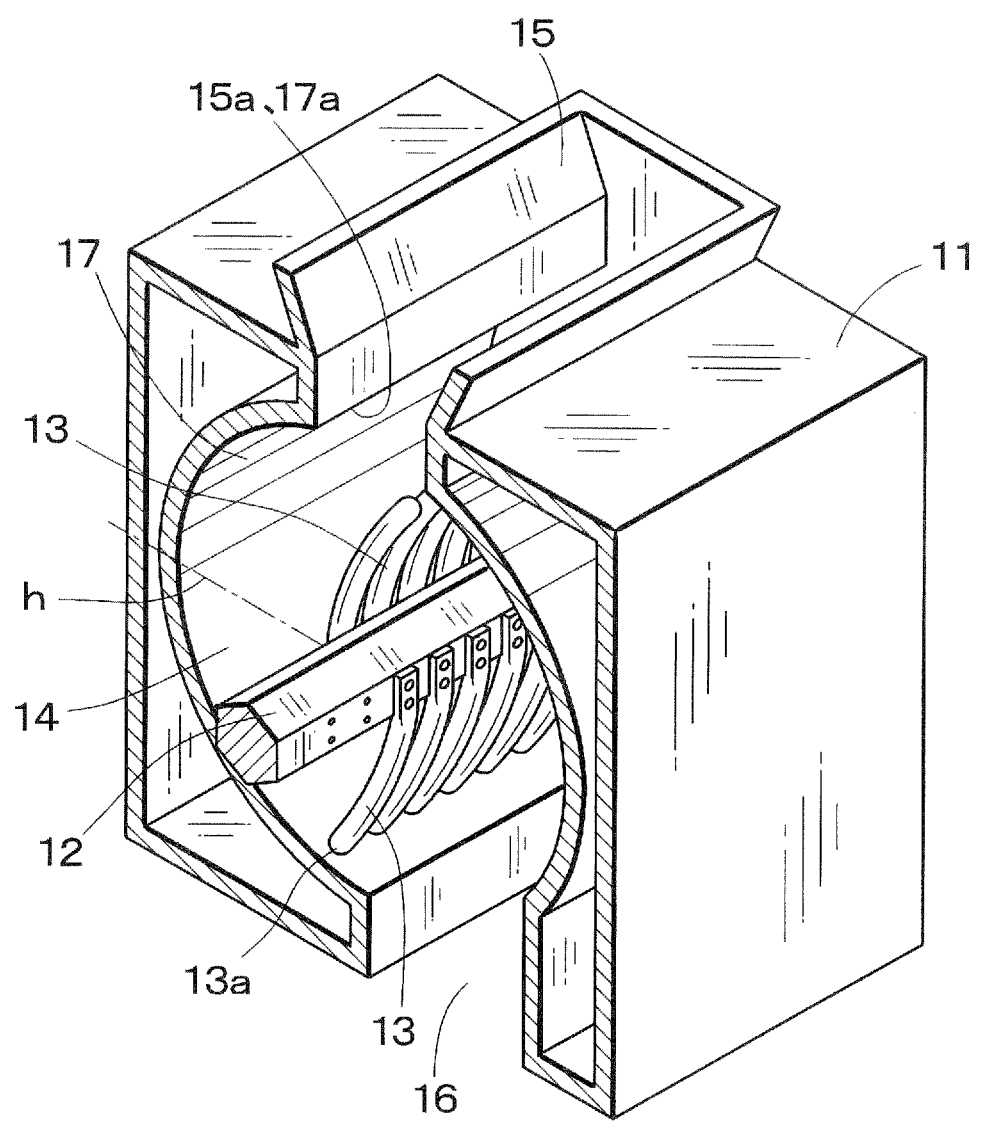
FIG. 1 is a perspective view showing a major portion of an embodiment 1 of the noodle unbinding apparatus according to the invention.
Figure 2:
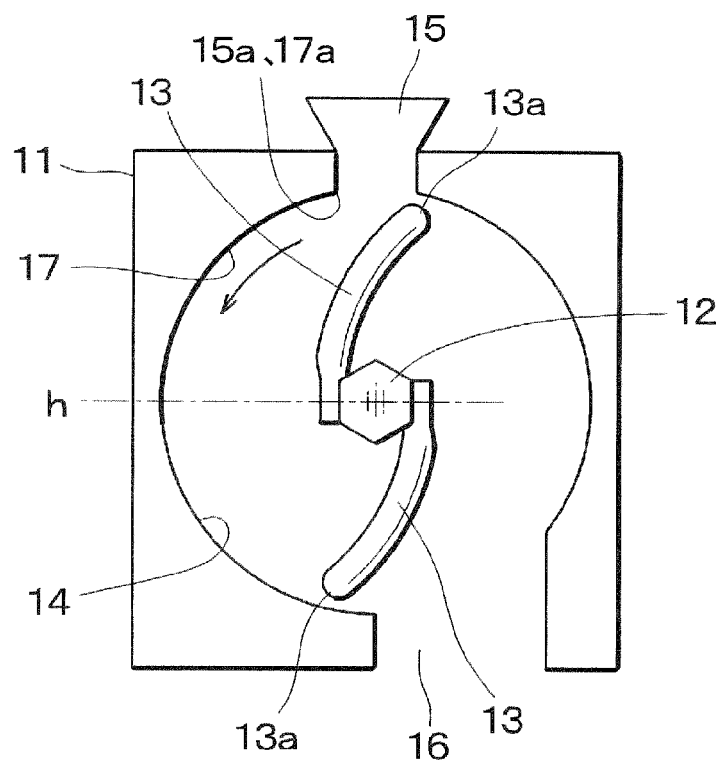
FIG. 2 is a cross sectional view of the embodiment 1.

FIGS. 1 and 2 are perspective and cross sectional views, respectively showing a major portion of a first embodiment 1 of the noodle unbinding apparatus according to the invention. A noodle unbinding step is provided between a streaming or boiling step and a drying step. The noodle unbinding apparatus used in this noodle unbinding step includes a metal housing 11 and a rotating shaft 12 is arranged horizontally at a central portion of the housing 11 such that the rotating shaft 12 can be rotated by an external driving means such as an electric motor not shown in the drawing. In the present embodiment, a pair of unbinding members is secured to the rotating shaft 12 at diagonally opposed positions. Each of the unbinding members is formed by a plurality of noodle unbinding rod 13 formed by a metal rod which having a given length and is bent to project toward a rotating direction of the rotating shaft 12, and these noodle unbinding rods 13 are secured to the rotating shaft 12 to extend in a direction perpendicular to an axial direction of the rotating shaft and to be aligned along the rotating shaft 12 to form a comb.

The rotating shaft 12 is formed by a metal rod having a cross sectional shape of polygon such as hexagon. The noodle unbinding rods 13 of each of the two unbinding members are secured to one surface of the polygon of the rotating shaft 12 by means of screws or welding, and therefore the noodle unbinding rods 13 can be fixed at given positions accurately. The noodle unbinding rods 13 are rotated by the rotating shaft 12 in a counter-clockwise direction in FIG. 2. Each of the noodle unbinding rods 13 is formed by a metal rod having a diameter of 8 mm and a tip 13a of the metal rod is formed in a semispherical shape such that noodles could hardly be cut by the unbinding rod 13. The successive unbinding rods 13 are separated by a pitch substantially equal to a diameter of the unbinding rods. Furthermore, the unbinding rods 13 of one of the two unbinding members may be shifted in an axial direction of the rotating shaft 12 with respect to the unbinding rods 13 of the other unbinding member by a half of the pitch.

The housing 11 includes an inner wall surface 14 having a cross sectional shape of a circular arc which is concentric to a circle drawn by a locus of the tips 13a of unbinding rods 13 and has a radius slightly larger than a radius of the circle drawn by the locus of the tips 13a of the unbinding rods 13. The housing 11 further includes an inlet 15 at an upper middle portion and an outlet 16 at a lower middle portion. A mass of mutually sticked noodles is introduced into the housing from the upper inlet 15 and a mass of unbound noodles is discharged from the lower outlet 16. A width of the housing 11 may be determined in accordance with a width of the noodle manufacturing line within a range from several tens cm to 1 m. It should be noted that the inlet 15 and outlet 16 have a width substantially equal to a width of the housing 11.

The unbinding rods 13 are rotated at a high speed by means of the driving shaft 12 in the counter-clockwise direction in FIG. 2 and the tips 13a of the unbinding rods 13 are moved along the inner wall surface 14 while a very small clearance is formed therebetween. A portion of the inner wall surface 14 extending from a horizontal level h corresponding to a level of the rotating shaft 12 to a lower end 15a of the inlet 15 serves as an unbinding surface 17. This unbinding surface 17 is formed by the circular arc and is separated from the unbinding rods 13 by a very small clearance. A mass of mutually sticked noodles heated by steam or boiled with a hot water in a previous manufacturing step is introduced into a boundary between the inlet 15 and the unbinding surface 17 and is effectively unbound upon passing through a region near an entrance 17a of the unbinding surface 17. It should be noted that the entrance 17a of the unbinding surface 17 situating at the boundary between the inlet 15 and the unbinding surface 17 is preferably formed to have a round surface such that the noodles might not be cut by the unbinding rods 13.

Figure 3:
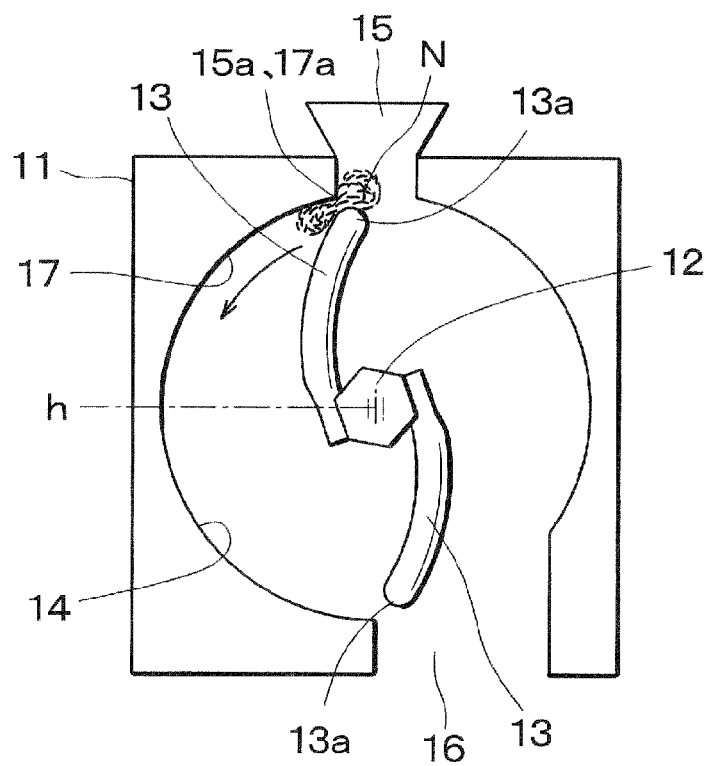
FIG. 3 is an explanatory view depicting a function of the noodle unbinding apparatus according to the invention.

The unbinding surface 17 locates at an upper portion of the inner wall surface 14 and extends to cover the unbinding rods 13. Particularly, the entrance 17a of the unbinding surface 17 has an important roll for effectively unbind the mutually sticked noodles. As illustrated in FIG. 3, a mass of mutually sticked noodles N serving for one meal is introduced into the housing 11 from the inlet 15 together with a given amount of water and is conveyed in the counter-clockwise direction by the unbinding rods 13 driven by the rotating shaft 12 into a position near the entrance 17a of the unbinding surface 17. A clearance between the entrance 17a of the unbinding surface 17 and the unbinding rods 13 is very small to form a very narrow space therebetween, and therefore a mass of noodles N is forcedly fed into this narrow space and is repeatedly unbound by means of the unbinding rods 13 rotating at a high speed.

While a mass of noodles N is retained in a range near the entrance 17a of the unbinding surface 17, the tips 13a of the unbinding rods 13 hit a mass of noodles N from ten to several tens times. In this manner, a mass of noodles N is effectively unbound by the unbinding rods 13, while the noodles are not cut.

Figure 4:
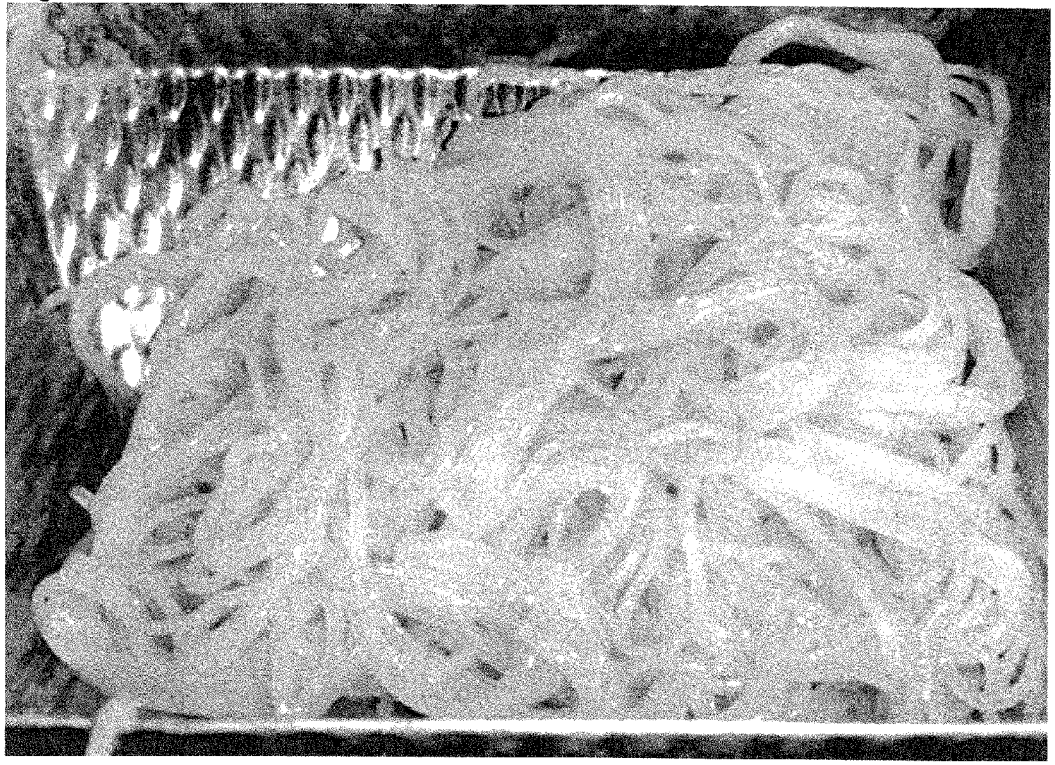
FIG. 4 is a photograph showing a mass of noodles before the unbinding operation.
Figure 5:
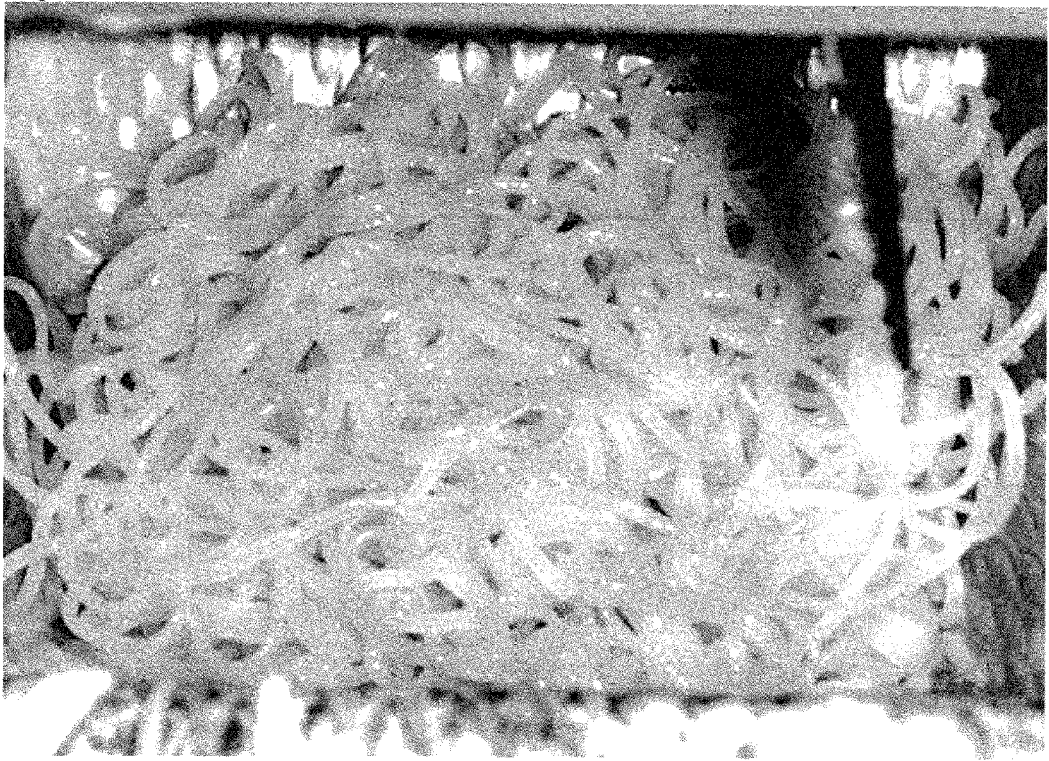
FIG. 5 is a photograph illustrating a mass of noodles after the unbinding operation.

FIG. 4 is a photograph representing a mass of noodles N before being charged into the noodle unbinding apparatus and FIG. 5 is a photograph showing a mass of noodles N being discharged out of the noodle unbinding apparatus. In a mass of noodles N before the unbinding operation, there are many stacks of mutually sticked noodles, but after the unbinding operation, the number of the stacks of mutually sticked noodles is decreased and the number of mutually sticked noodles in a stack is also reduced.

It has been experimentally confirmed that in order to attain an effective unbinding function, a clearance between the unbinding surface 17 and the unbinding rods 13 may be preferably set to 4-5 mm. The smaller the clearance is, the more resistance for retaining a mass of noodles N in a region near the entrance 17a of the unbinding surface 17 can be obtained. However, if the clearance is set to a too small value, a mass of noodles N might be damaged and the unbinding rods 13 might be brought into contact with the unbinding surface 17. It is easily understood that if the clearance is too large, a mass of noodles N could not be subjected to a sufficient resistance and might pass through the unbinding surface 17 within a very short time period.

The following tables 1 and 2 represent a result of experiments for proving the unbinding function with and without the unbinding surface according to the invention. In the experiments with the unbinding surface according to the invention, use was made of the unbinding surface 17 illustrated in FIG. 2 and the clearance between the unbinding surface 17 and the unbinding rods 13 was set to 5 mm. Experiments without the unbinding surface according to the invention were conducted by using the known noodle unbinding apparatus shown in FIG. 17. At first, steamed noodles were prepared in the following manner. A wheat flour of 900 gr and a potato starch of 100 gr were mixed with a solution containing a water of 330 ml, a sodium carbonate of 3 gr and a salt of 10 gr and a mass of these materials was kneaded to obtain a dough. Then, the dough thus obtained was pressed and was cut by means of a cutting blade of No. 20 to produce noodles having a thickness of 1.2 mm. After the noodles were corrugated to make waves, the noodles were continuously heated by steam. Finally the noodles were cut into a mass of noodles having a length of about 60 cm. The mass of noodles thus obtained has a weight of 100 gr and is served for one meal. After spraying fresh water on the noodles, a mass of noodles was charged into the noodle unbinding apparatuses. Each of the experiments was conducted twenty times. A time period was measured by means of a stopwatch.

The rotating shaft 12 was rotated at 1000 rpm (round/minute), and the unbinding rods 13 were formed by the curved round rods shown in the embodiment 1. A degree of unbinding is represented by "A" extremely excellent, "B" excellent, "C" ordinary and "D" bad.

TABLE 1

Time from Charge to Discharge and Degree of Unbinding

| Test Number | Without Unbinding Surface | With Unbinding Surface |
| --- | --- | --- |
| 1 | 0.59 | 0.80 |
| 2 | 0.55 | 0.85 |
| 3 | 0.54 | 0.83 |
| 4 | 0.52 | 0.78 |
| 5 | 0.55 | 0.85 |
| 6 | 0.55 | 0.86 |
| 7 | 0.58 | 0.85 |
| 8 | 0.57 | 0.84 |
| 9 | 0.56 | 0.85 |
| 10 | 0.56 | 0.84 |
| 11 | 0.52 | 0.82 |
| 12 | 0.55 | 0.83 |
| 13 | 0.53 | 0.86 |
| 14 | 0.55 | 0.83 |
| 15 | 0.58 | 0.84 |
| 16 | 0.57 | 0.80 |
| 17 | 0.56 | 0.83 |
| 18 | 0.56 | 0.84 |
| 19 | 0.57 | 0.83 |
| 20 | 0.58 | 0.82 |
| Average | 0.557 | 0.833 |
| Degree of Unbinding | C | A |

TABLE 2

Retaining Time (second) of Noodles near Inlet 15

| Test Number | Without Unbinding Surface | With Unbinding Surface |
| --- | --- | --- |
| 1 | 0.30 | 0.64 |
| 2 | 0.35 | 0.65 |
| 3 | 0.33 | 0.64 |
| 4 | 0.32 | 0.62 |
| 5 | 0.30 | 0.66 |
| 6 | 0.32 | 0.64 |
| 7 | 0.32 | 0.65 |
| 8 | 0.31 | 0.63 |
| 9 | 0.30 | 0.62 |
| 10 | 0.32 | 0.64 |
| 11 | 0.30 | 0.65 |
| 12 | 0.34 | 0.63 |
| 13 | 0.32 | 0.63 |
| 14 | 0.33 | 0.62 |
| 15 | 0.30 | 0.60 |
| 16 | 0.32 | 0.64 |
| 17 | 0.35 | 0.63 |
| 18 | 0.32 | 0.65 |
| 19 | 0.30 | 0.62 |
| 20 | 0.32 | 0.64 |
| Average | 0.319 | 0.635 |

In the Table 1, a function of the unbinding surface can be estimated by a time period during which a mass of noodles N is retained near the entrance 17a of the unbinding surface 17. That is to say, in the known noodle unbinding apparatus shown in FIG. 17, a mass of noodles N passes through an upper portion of the inner wall surface 5 for the measured time period, while in the noodle unbinding apparatus shown in FIG. 3, a mass of noodles N is held in an area near the entrance 17a of the unbinding surface 17 for the measured time period. Therefore, a resistance subjected to a mass of noodles N can be represented by the measured time period and a degree of unbinding function is related to the measured time period. In the Tables 1 and 2, the longer time periods can be obtained with the unbinding surface according to the invention and a mass of noodles N is subjected to the unbinding operation by the unbinding rods 13 for a longer time period.

Figure 6:
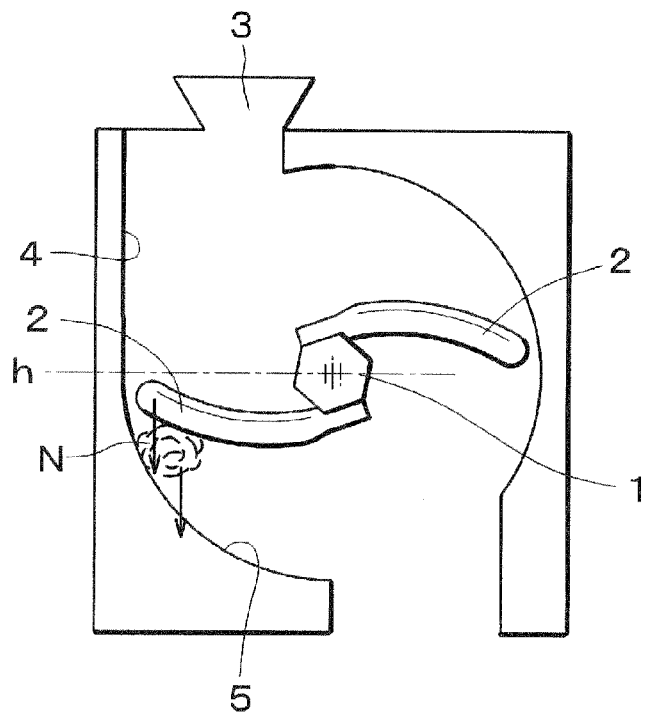
FIG. 6 is an explanatory view representing the unbinding operation without the unbinding inner wall surface of the present invention.
Figure 17:
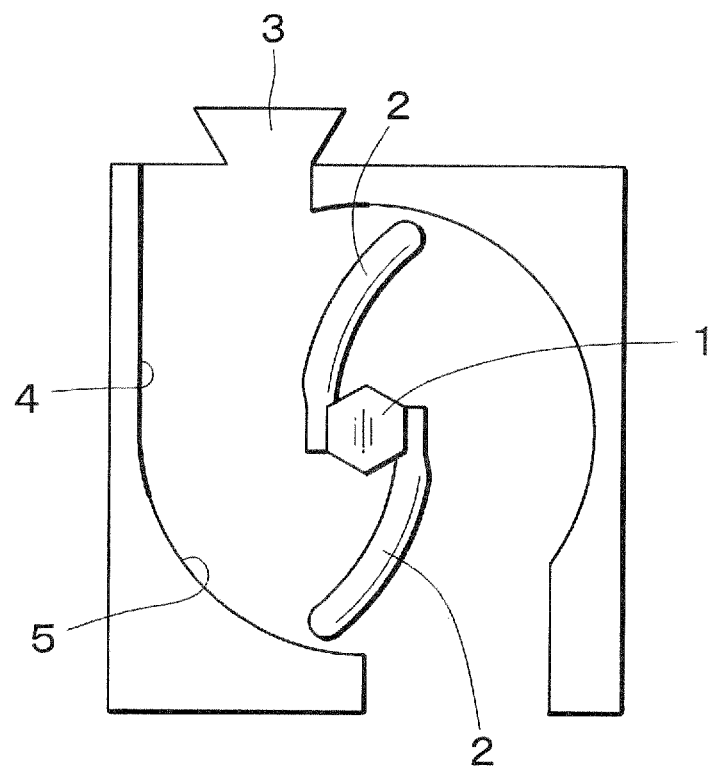
FIG. 17 is a cross sectional view showing a known noodle unbinding apparatus.

FIG. 6 is an explanatory figure representing the unbinding operation of the known noodle unbinding apparatus illustrated in FIG. 17. In the known apparatus, a mass of noodles N charged into the inlet 3 at an upper portion of the upper inner wall surface 4 is subjected to a force due to the gravity as well as to a force by the noodle hitting rods 2, and these two forces are directed downward. That is to say, in the known apparatus, the noodle hitting rods 2 give a mass of noodles the force whose direction is identical with that of the gravitational force. Therefore, a mass of noodles N could not be remained in a region near the entrance of the inner wall surface 5 and easily passes through the inner wall surface 5 within a short time period.

Figure 7:
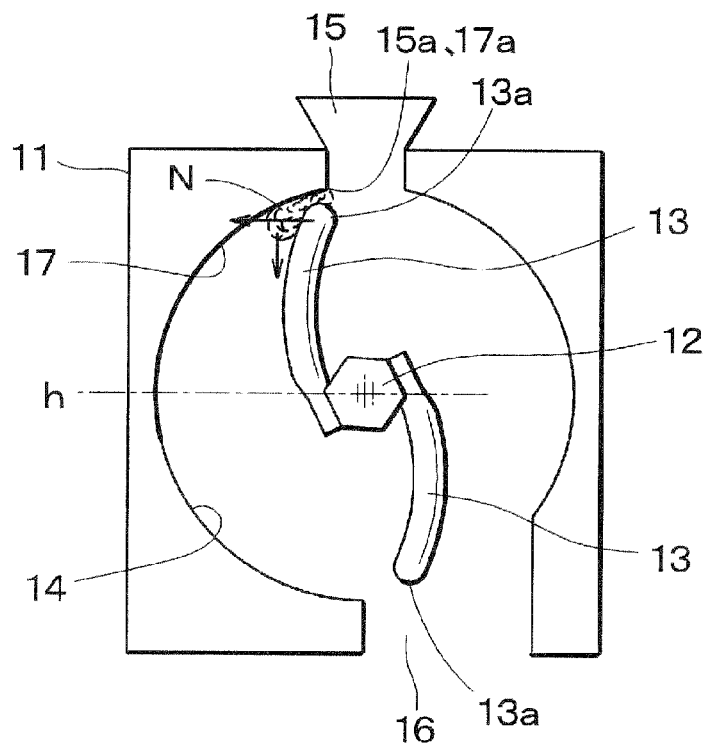
FIG. 7 is an explanatory view showing the unbinding operation with the unbinding inner wall surface according to the invention.

In the noodle unbinding apparatus of the above explained embodiment 1 of the present invention, when a mass of noodles N is charged into the apparatus from the upper inlet 15, a mass of noodles is subjected to a horizontal force as shown by an arrow in FIG. 7, when a mass of noodles N passes through the entrance 17a of the unbinding surface 17. In this manner, a mass of noodles N is subjected not only to the gravitational force but also to the horizontal force, and therefore a mass of noodles N is retained in a region near the entrance 17a of the unbinding surface 17 for a longer time period. During this longer time period, the unbinding rods 13 hit a mass of noodles N repeatedly against the unbinding surface 17, and at the same time, the mutually sticked noodles are unbound effectively.

In the manner explained above, in the present embodiment 1, a mass of noodles N is introduced in to the narrow space between the unbinding surface 17 and the unbinding rods 13 and is forcedly unbound by means of the unbinding rods 13. Therefore, a degree of binding condition of a mass of noodles N can be decreased effectively.

It is important for attaining the effective unbinding function of the unbinding rods for a mass of noodles how to determine a position of the entrance 17a of the unbinding surface 17 with respect to the inner wall surface 14. The effective unbinding function can be performed by providing the unbinding surface 17 above the horizontal level h. Furthermore, it is advantageous to extend the unbinding surface 17 up to the up most position as far as possible in order to produce a large resistance for unbinding a mass of noodles. In the known noodle unbinding apparatus, the unbinding surface is provided below the horizontal level h, and therefore a sufficiently large resistance for unbinding function could not be produced and a mass of noodles passes through the unbinding surface within a very short time period.

Figure 8:
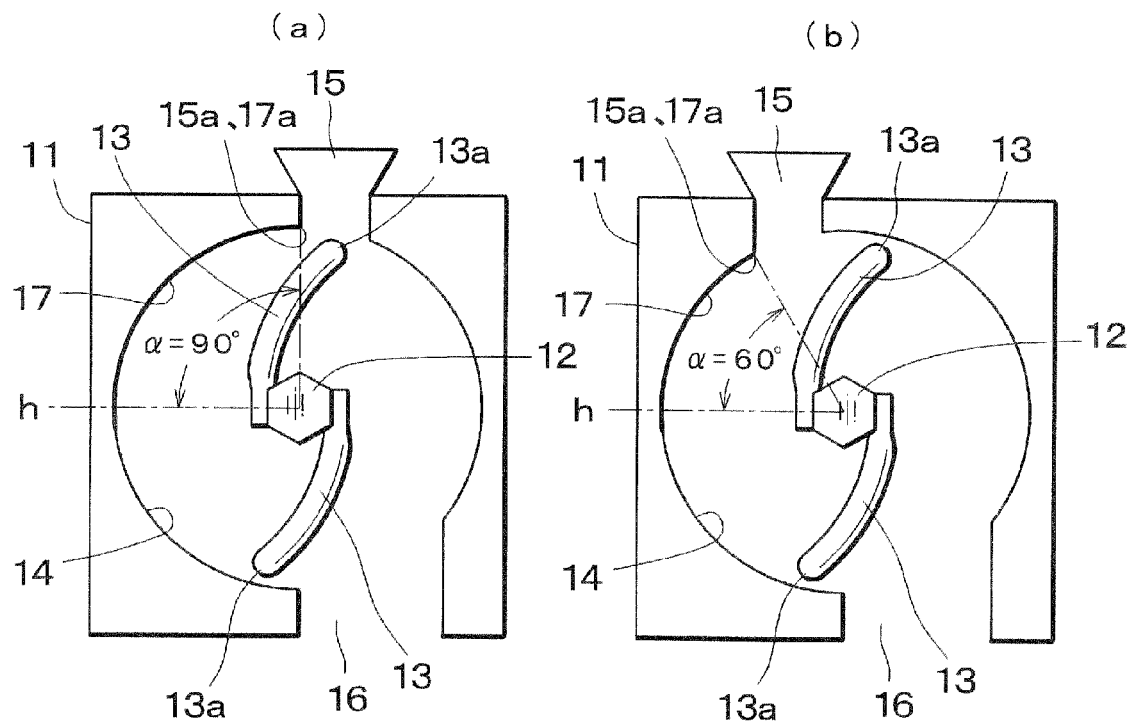
FIGS. 8(a)-8(d) are views showing various unbinding inner wall surfaces having different extending angles.
Figure 8:
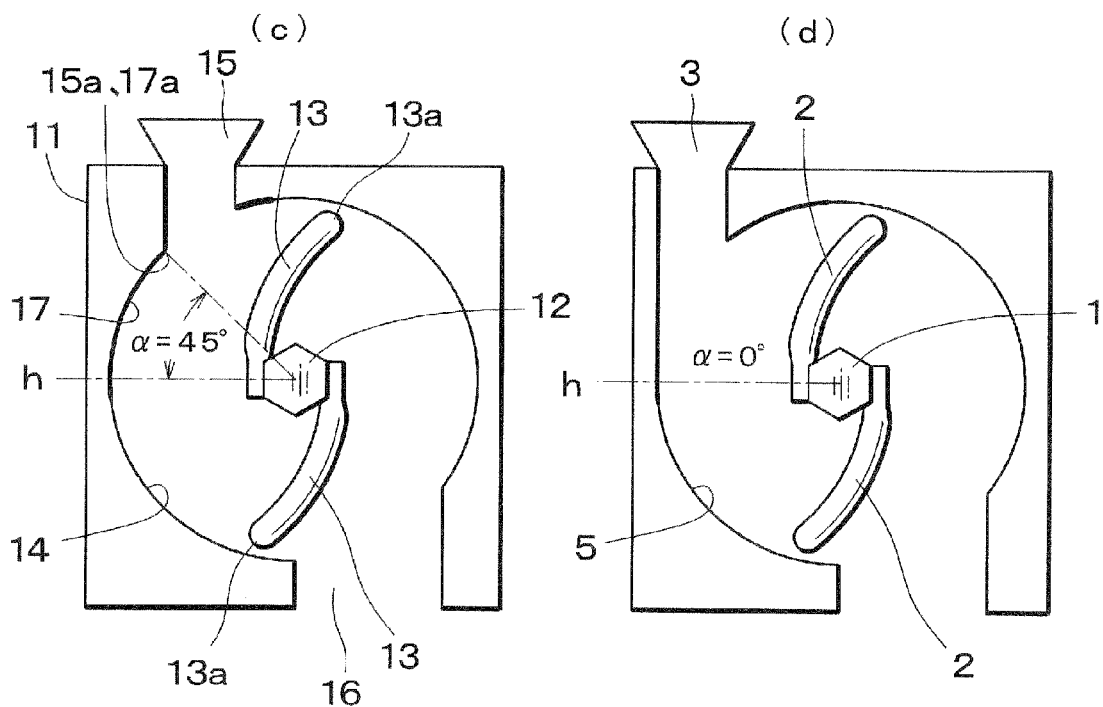

The following Tables 3 and 4 represent a change in the unbinding function due to the position of the unbinding surface 17. Experiments similar to the previously explained experiments were conducted, while an unbinding angle α of the unbinding surface 17 was changed. FIGS. 8(a) to 8(c) represent various unbinding angles α realized by changing a position of the entrance 17a of the unbinding surface 17. The unbinding angle α may be defined as an angle over which the unbinding surface 17 extends from the horizontal level h to the entrance 17a of the unbinding surface 17, i.e. the lower end 15a of the inlet 15. FIG. 8(d) illustrates the known noodle unbinding apparatus, in which the unbinding angel α is set to 0°.

TABLE 3

Time from Charge to Discharge and Degree of Unbinding

| Test Number | Angel α | 0° | 45° | 60° | 90° |
|---|---|---|---|---|---|
| 1 | | 0.59 | 0.65 | 0.70 | 0.80 |
| 2 | | 0.55 | 0.66 | 0.68 | 0.85 |
| 3 | | 0.54 | 0.67 | 0.71 | 0.83 |
| 4 | | 0.52 | 0.68 | 0.69 | 0.78 |
| 5 | | 0.55 | 0.67 | 0.72 | 0.85 |
| 6 | | 0.54 | 0.65 | 0.70 | 0.83 |
| 7 | | 0.52 | 0.67 | 0.73 | 0.84 |
| 8 | | 0.55 | 0.68 | 0.68 | 0.82 |
| 9 | | 0.52 | 0.63 | 0.68 | 0.83 |
| 10 | | 0.51 | 0.63 | 0.69 | 0.81 |
| 11 | | 0.55 | 0.62 | 0.70 | 0.85 |
| 12 | | 0.54 | 0.64 | 0.67 | 0.83 |
| 13 | | 0.54 | 0.64 | 0.68 | 0.81 |
| 14 | | 0.55 | 0.67 | 0.68 | 0.79 |
| 15 | | 0.53 | 0.68 | 0.70 | 0.80 |
| 16 | | 0.52 | 0.64 | 0.72 | 0.82 |
| 17 | | 0.57 | 0.65 | 0.71 | 0.83 |
| 18 | | 0.55 | 0.65 | 0.69 | 0.82 |
| 19 | | 0.53 | 0.64 | 0.68 | 0.83 |
| 20 | | 0.58 | 0.68 | 0.70 | 0.79 |
| Average | | 0.543 | 0.656 | 0.696 | 0.821 |
| Degree of Unbinding | | C | B | A | A |

TABLE 4

Retaining Time (second) of Noodles near Inlet 15

| Test Number | Angel α | 0° | 45° | 60° | 90° |
|---|---|---|---|---|---|
| 1 | | 0.30 | 0.42 | 0.50 | 0.64 |
| 2 | | 0.35 | 0.43 | 0.48 | 0.65 |
| 3 | | 0.33 | 0.42 | 0.50 | 0.64 |
| 4 | | 0.32 | 0.43 | 0.49 | 0.62 |
| 5 | | 0.30 | 0.40 | 0.50 | 0.66 |
| 6 | | 0.34 | 0.43 | 0.51 | 0.65 |
| 7 | | 0.32 | 0.42 | 0.48 | 0.66 |
| 8 | | 0.30 | 0.42 | 0.48 | 0.65 |
| 9 | | 0.34 | 0.40 | 0.47 | 0.66 |
| 10 | | 0.35 | 0.43 | 0.50 | 0.64 |
| 11 | | 0.33 | 0.42 | 0.47 | 0.65 |
| 12 | | 0.32 | 0.43 | 0.48 | 0.65 |
| 13 | | 0.30 | 0.41 | 0.49 | 0.62 |
| 14 | | 0.33 | 0.42 | 0.50 | 0.64 |
| 15 | | 0.35 | 0.43 | 0.49 | 0.64 |
| 16 | | 0.30 | 0.42 | 0.48 | 0.65 |
| 17 | | 0.32 | 0.40 | 0.49 | 0.66 |
| 18 | | 0.33 | 0.42 | 0.49 | 0.67 |
| 19 | | 0.32 | 0.43 | 0.50 | 0.63 |
| 20 | | 0.30 | 0.41 | 0.48 | 0.63 |
| Average | | 0.323 | 0.420 | 0.489 | 0.645 |

As can be understood from the Tables 3 and 4, the larger the unbinding angle α is, the longer time period for unbinding the noodles retained in a region near the entrance 17a of the unbinding surface 17 can be obtained and much more effective unbinding function can be performed. This is due to the fact that the force to which a mass of noodles is subjected becomes near the horizontal direction and a mass of noodles can be retained in the unbinding area for a longer time period.

The uppermost position of the entrance 17a of the unbinding surface 17 may be set to a position at which the tips 13a of the unbinding rods 13 become the highest position. That is to say, the maximum unbinding angle α should be set to about 90°. If the unbinding angle α is set to a value larger than 90°, a force given by the unbinding rods 13 to a mass of noodles is directed upwardly, and some noodles might be ejected upwardly out of the inlet 15.

The following Table 5 represents a relation between the rotating speed of the rotating shaft 12 and a degree of unbinding. The experiments were conducted in a similar manner to the previous experiments and the unbinding angle α of the unbinding surface 17 was set to 90°.

TABLE 5

Relation between Rotation Speed of Shaft 12 and Degree of Unbinding

| | rpm | | | | | | |
|---|---|---|---|---|---|---|---|
| | 100 | 300 | 500 | 800 | 1000 | 1200 | 1500 |
| Degree of Unbinding | D | D | D | B | A | A | A |

From the experimental results shown in the Table 5, it is understood that the rotation speed of the rotating shaft 12 is preferably set to a value not less than 800 rpm. When the rotation speed is too low, a mass of noodles could not be effectively brought into contact with the unbinding rods 13 and might be dropped toward the rotating shaft 12. Furthermore, a mass of noodles for one meal can be unbound much more efficiently in accordance with in increase of the number of contacts of the noodles with the unbinding rods 13.

Figure 9:
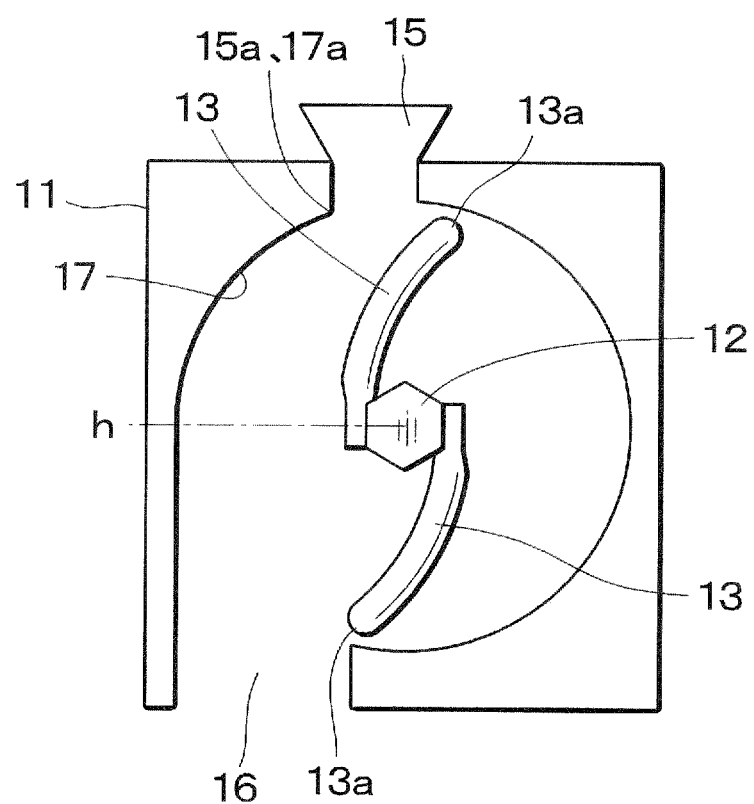
FIG. 9 is a cross sectional view presenting a modified shape of the unbinding inner wall surface.

FIG. 9 is a cross sectional view showing a modified inner wall surface of the noodle unbinding apparatus according to the invention. A portion of the inner wall surface below the horizontal level h is not curved but is formed to be upright. In the known noodle unbinding apparatus, a portion of the inner wall surface situating below the horizontal level forms the unbinding surface and performs the unbinding function to a certain extent. According to the invention, the unbinding surface 17 provided above the horizontal level h can perform the sufficient unbinding function, and therefore the unbinding surface situating below the horizontal level h can be dispensed with.

Figure 10:
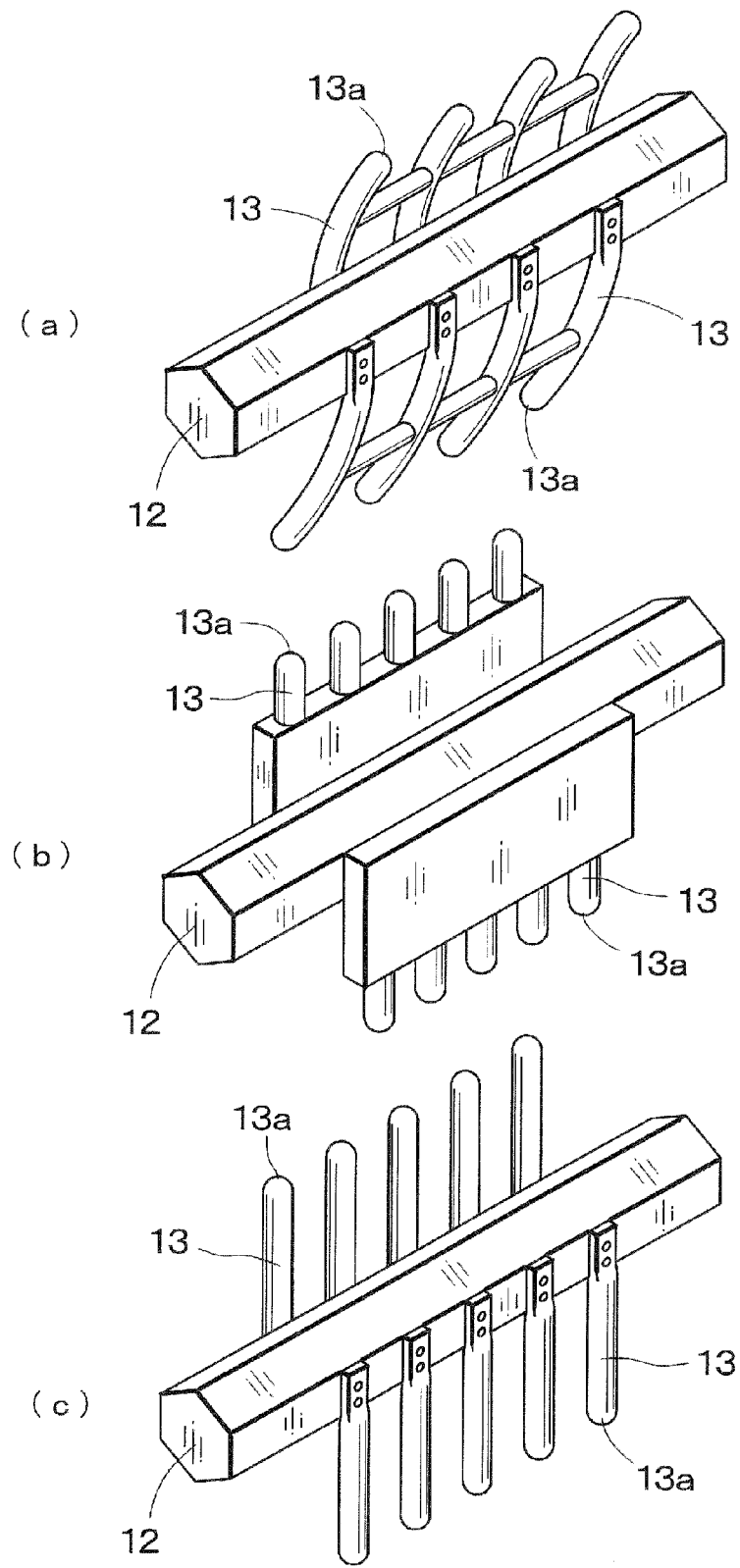
FIGS. 10(a)-(c) are perspective views illustrating various shapes of the unbinding rod according to the invention.

In the present embodiment, the unbinding rods 13 are arranged like a comb, but according to the invention, the unbinding rods 13 may be formed in various forms as illustrated in FIGS. 10(a)-10(c), in which curved unbinding rods 13 secured to the rotating shaft 12 are coupled with each other at middle portions thereof, straight short unbinding rods 13 are projected from a plate-like block secured to the rotating shaft 12, and straight unbinding rods 13 are secured to the rotating shaft 12.

In order to unbind a mass of noodles much more effectively, a clearance between the unbinding rods 13 and the unbinding surface 17 is adjusted and the unbinding rods 13 are formed to scrape the noodles. For instance, the tip of the unbinding rod may be formed to have depressions and projections. Moreover, when the unbinding rods 13 are curved as shown in the first embodiment, a mass of noodles could be hardly curled around the unbinding rods.

In the embodiment 1, the unbinding rods 13 are secured to the rotating shaft 12 to form two columns. According to the invention, only one column of the unbinding rods 13 may be provided on the rotating shaft 12 or three columns of the unbinding rods 13 may be secured to the rotating shaft 12 to form three columns which are separated from each other in the circumferential direction by equal angles. The umber of columns of the unbinding rods 13 may be suitably determined in relation of the rotation speed of the rotating shaft 12.

In order to give a mass of noodles much larger resistance, the unbinding surface 17 may be machined to have a rough surface such as embossing or small rids extending in a direction perpendicular to a moving direction of a mass of noodles may be formed on the unbinding surface 17.

Embodiment 2

Figure 11:
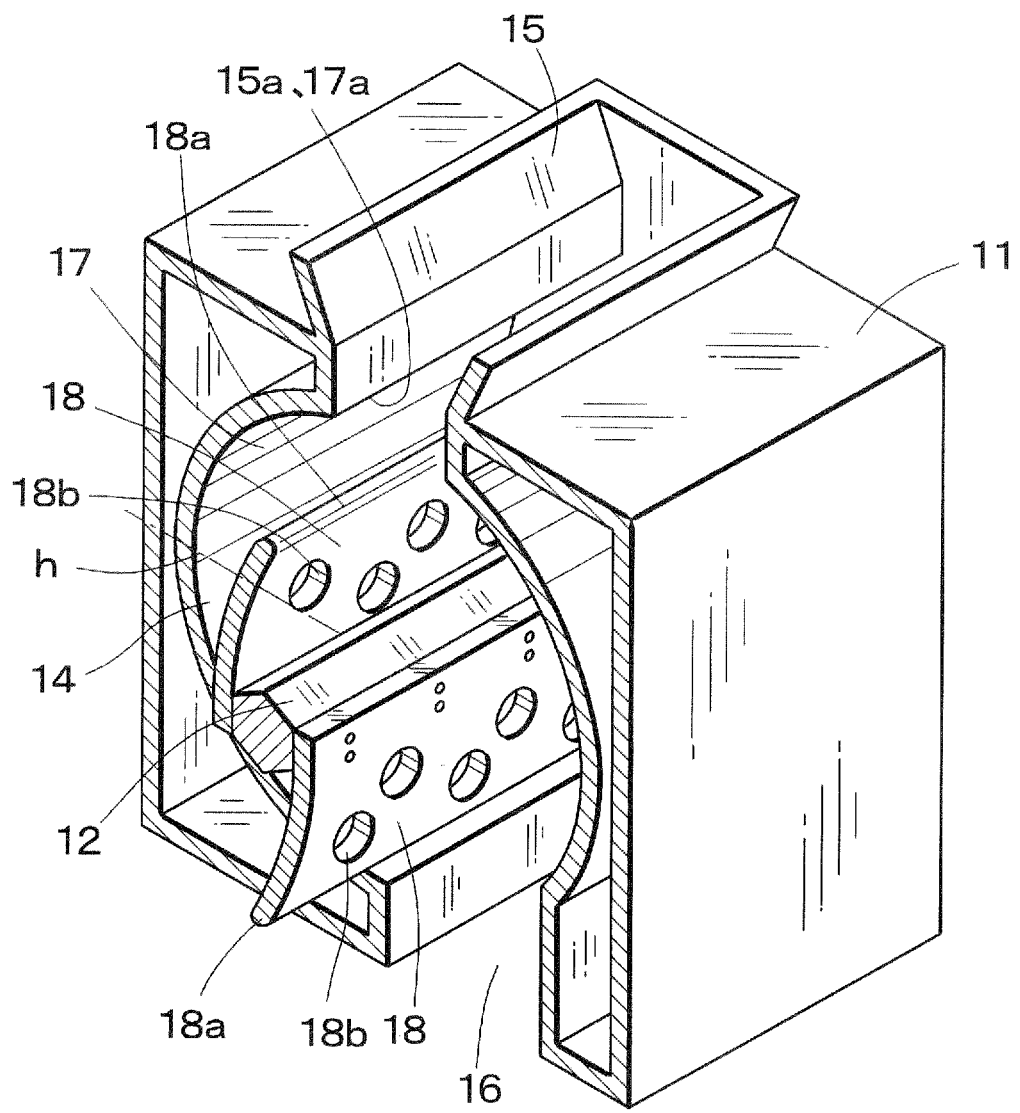
FIG. 11 is a perspective view showing a major portion of a second embodiment 2 of the noodle unbinding apparatus according to the invention.

FIG. 11 is a perspective view depicting a major portion of a second embodiment of the noodle unbinding apparatus according to the invention. The unbinding member includes two unbinding plates 18 which are secured to a rotating shaft 12 at diagonally opposite positions. The unbinding plates 18 are curved toward the rotational direction.

A tip 18a of the unbinding plate 18 has a semicircular cross sectional shape so that a mass of noodles could not be damaged by the unbinding plate. Furthermore, in order to decrease a generation of wind, several holes 18b are formed in the unbinding plate 18.

As compared with the unbinding rods 13 of the first embodiment 1, the unbinding plates 18 used in the present embodiment 2 have no function to comb the mutually entangled noodles, but a mass of noodles can be effectively unbound by the tips 18a of the unbinding plates 18 in a region near the entrance 17a of the unbinding surface 17 in a similar manner to the first embodiment. Since the unbinding plates 18 has no vacant spaces between the comb-like unbinding rods 13, the unbinding function can be performed over a whole width of a mass of noodles.

Embodiment 3

Figure 12:
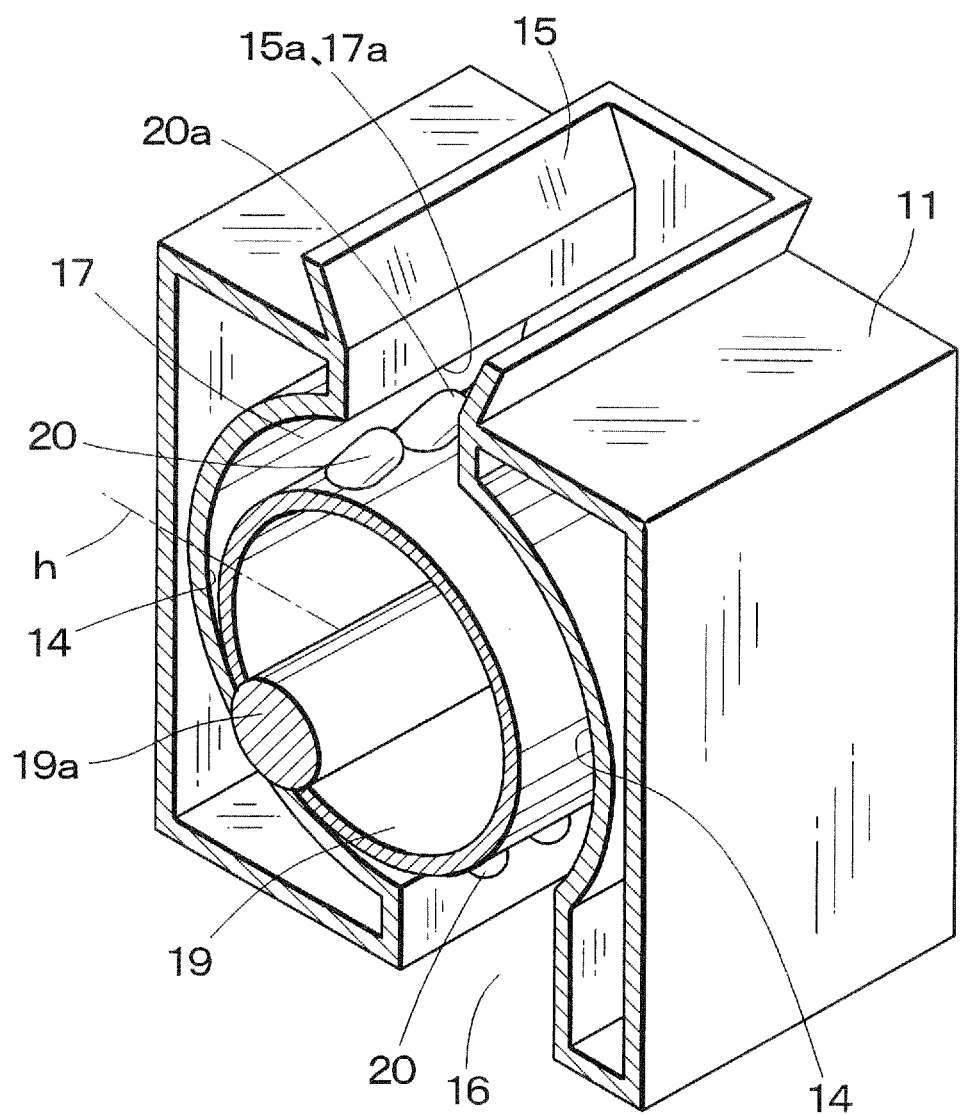
FIG. 12 is a perspective view depicting a major portion of a third embodiment of the noodle unbinding apparatus according to the invention.
Figure 13:
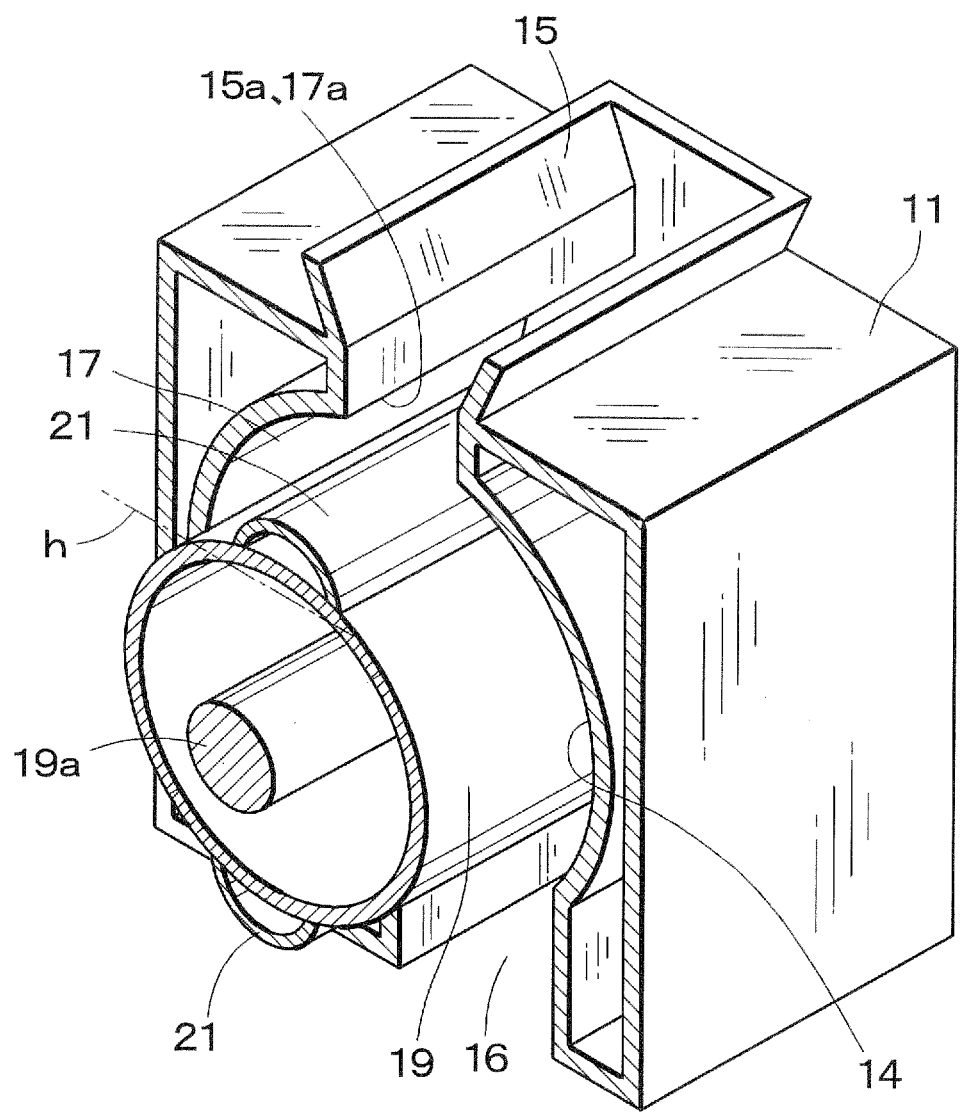
FIG. 13 is a perspective view representing a major portion of a fourth embodiment of the noodle unbinding apparatus according to the invention.

FIG. 12 is a perspective view showing a major portion of a third embodiment 3 of the noodle unbinding apparatus according to the invention. In the present embodiment, a rotating drum 19 having a large diameter is secured to a shaft 19a and tow columns of short unbinding projections 20 are provided on an outer surface of the drum 19. Each of the unbinding projections 20 has a similar shape as the tip 13a of the unbinding rods 13 of the first embodiment 1. In the present embodiment, the effective unbinding function can be performed like as the first embodiment 1.

In the third embodiment 3, since use is made of the drum 20 having a large diameter, a mass of noodles might not be dropped toward the rotating shaft 19a even if the rotation speed of the drum 20 is low. It should be noted that the rotating drum 20 may be formed in various shapes such as elliptical shape and rectangular tube shape. In such a case, tops of the drum may be formed as the unbinding member or unbinding members may be provided at the tops of the drum.

Embodiment 4

Figure 14:
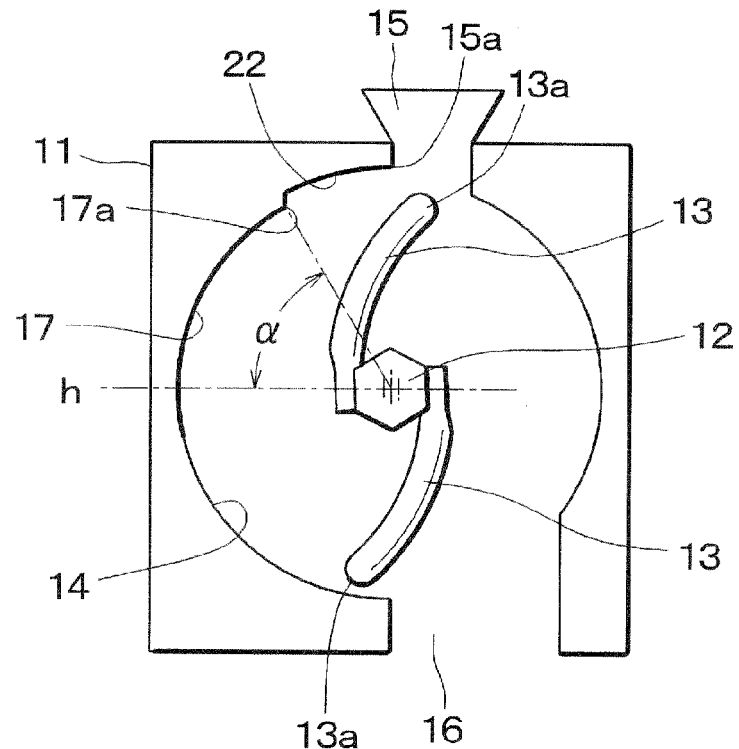
FIG. 14 is a cross sectional view showing a fifth embodiment 5 of the noodle unbinding apparatus according to the invention.

FIG. 14 is a perspective view illustrating a major portion of a fourth embodiment 4 of the noodle unbinding apparatus according to the invention. In the present embodiment 4, tow ridges 21 are provided on an outer surface of a rotating drum 19. Also in the fourth embodiment 4, the effective unbinding function similar to that of the second and third embodiments 2 and 3 can be attained.

Embodiment 5

FIG. 14 is a cross sectional view depicting a fifth embodiment 5, in which a preparatory unbinding surface 22 is provided between the entrance 17a of the unbinding surface 17 and a lower end 15a of the inlet 15 in the first embodiment 1. A clearance between the tips 13a of the unbinding rods 13 and the preliminary unbinding surface 22 is slightly larger than the clearance between the tips 13a of the unbinding rods 13 and the unbinding surface 17. The unbinding surface 17 has the unbinding angle of 60°.

In the fifth embodiment 5, a mass of noodles charged from the inlet 15 is hit by the unbinding rods 13 in a region near the preparatory unbinding surface 22 and a preparatory unbinding function is performed. Then, a mass of noodles is repeatedly hit by the unbinding rods 13 in a narrow space near the entrance 17a of the unbinding surface 17. In this manner, a mass of noodles is subjected to the effective unbinding operation.

In this embodiment 5, a mass of noodles N can be easily retained in the unbinding region and can be effectively subjected to the preparatory unbinding operation due to the existence of the preparatory unbinding surface 22.

Figure 15:
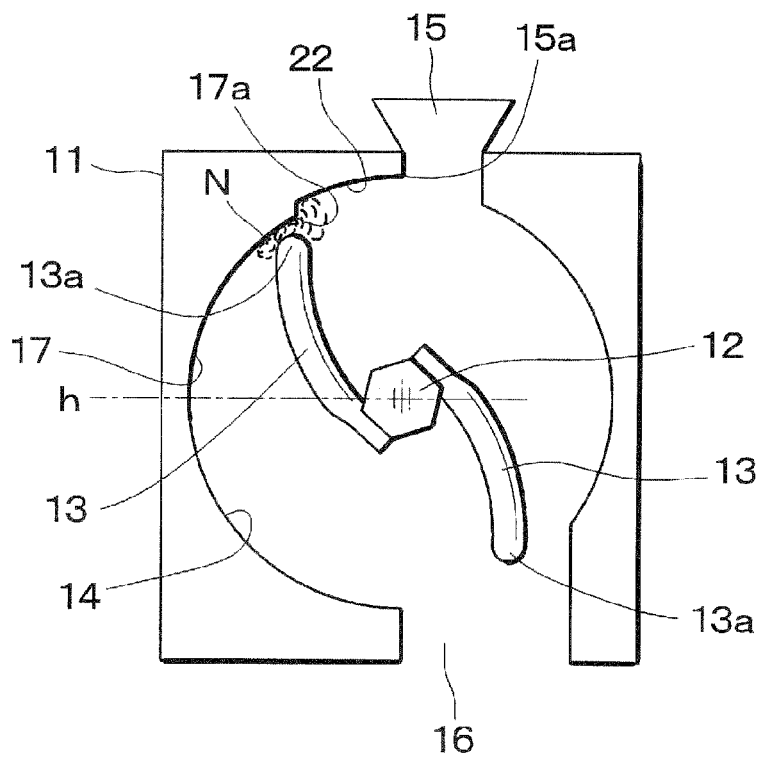
FIG. 15 is a cross sectional view representing the unbinding operation of the fifth embodiment 5.
Figure 16:
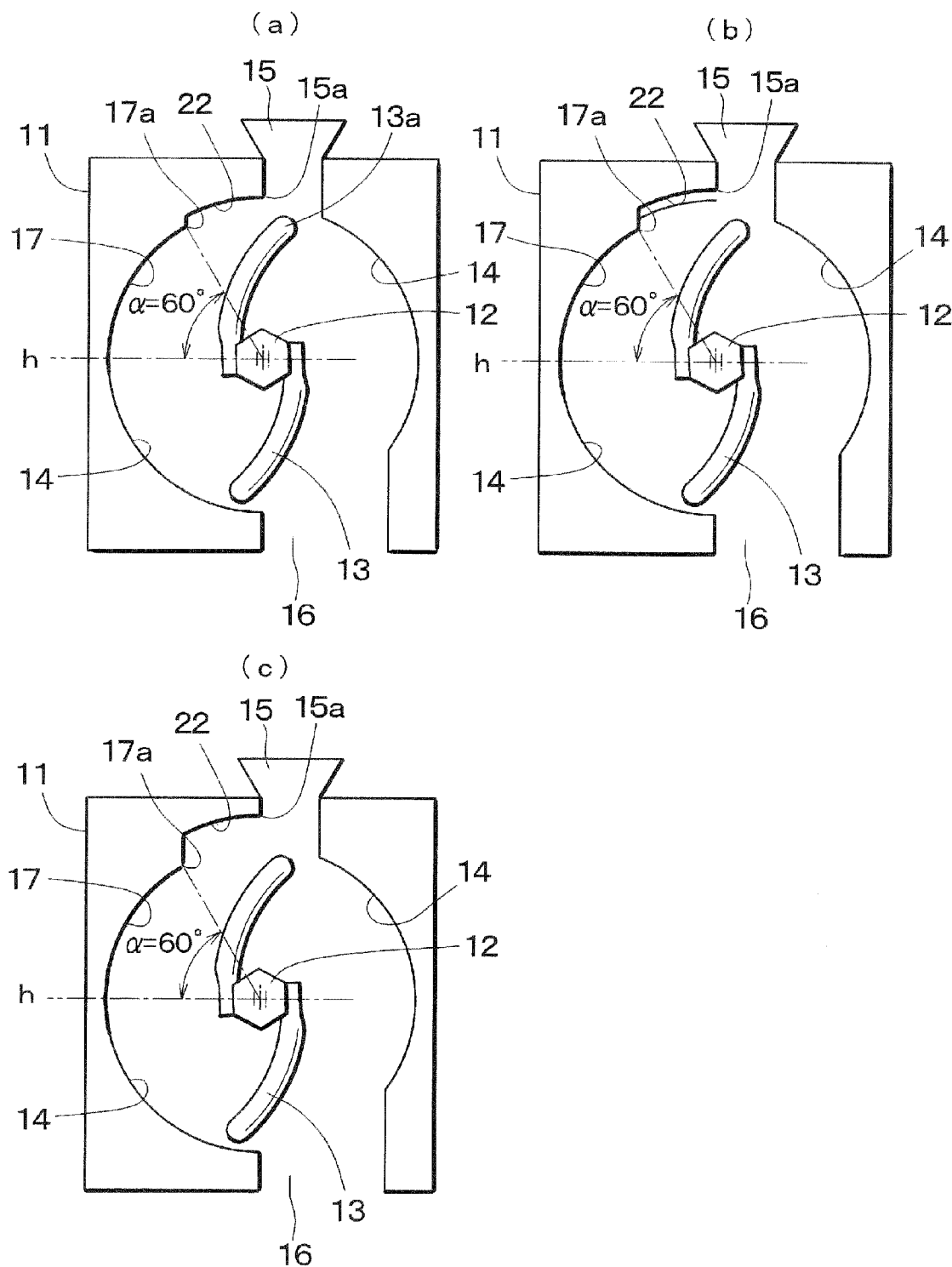
FIGS. 16(a)-(c) are cross sectional views showing various unbinding inner wall surfaces having different clearances between a preparatory unbinding inner wall surface and a noodle unbinding rod.

The following Table 6 represents the relation between amounts of the clearance of the preparatory unbinding surface 22 and the tips 13a of the unbinding rods 13 and a degree of the unbinding function. Several noodle unbinding apparatuses having different clearances shown in FIGS. 16(a) to 16(d) were manufactured. In FIG. 16(a), the clearance between the preparatory unbinding surface 22 and the unbinding rods 13 was set to 10 mm, in FIG. 16(b) 15 mm, in FIG. 16(c) the clearance was set to 20 mm. In all apparatuses, the clearance between the unbinding surface 17 and the unbinding rods 13 was set to 5 mm. Furthermore, the unbinding angle α over which the unbinding surface 17 extends from the horizontal level h to the entrance 17a of the unbinding surface 17 was set to 60°.

In the Table 6, a column (d) represents the experiment results obtained by using the noodle unbinding apparatus without the preparatory unbinding surface 22 shown in FIG.

8(a). In this apparatus, the clearance of the unbinding surface with respect to the unbinding rods was set to 5 mm and the unbinding angle α was set to 90°.

TABLE 6

Time (second) from Charge to Discharge

| Test Number | (a) | (b) | (c) | (d) |
|---|---|---|---|---|
| 1 | 0.91 | 0.91 | 0.76 | 0.81 |
| 2 | 0.88 | 0.87 | 0.78 | 0.82 |
| 3 | 0.91 | 0.84 | 0.82 | 0.78 |
| 4 | 0.88 | 0.90 | 0.81 | 0.79 |
| 5 | 0.94 | 0.88 | 0.86 | 0.81 |
| 6 | 0.92 | 0.87 | 0.78 | 0.78 |
| 7 | 0.91 | 0.86 | 0.79 | 0.80 |
| 8 | 0.89 | 0.89 | 0.76 | 0.77 |
| 9 | 0.90 | 0.92 | 0.80 | 0.82 |
| 10 | 0.94 | 0.91 | 0.79 | 0.83 |
| 11 | 0.92 | 0.87 | 0.81 | 0.82 |
| 12 | 0.89 | 0.91 | 0.80 | 0.84 |
| 13 | 0.90 | 0.91 | 0.76 | 0.79 |
| 14 | 0.91 | 0.89 | 0.79 | 0.78 |
| 15 | 0.92 | 0.90 | 0.77 | 0.79 |
| 16 | 0.88 | 0.88 | 0.81 | 0.80 |
| 17 | 0.88 | 0.91 | 0.82 | 0.81 |
| 18 | 0.90 | 0.91 | 0.79 | 0.83 |
| 19 | 0.91 | 0.89 | 0.78 | 0.80 |
| 20 | 0.93 | 0.87 | 0.79 | 0.79 |
| Average | 0.906 | 0.890 | 0.794 | 0.803 |

From the Table 6, it has been experimentally confirmed that by providing the preparatory unbinding surface 22 with a suitable clearance larger than that of the unbinding surface 17, a mass of noodles can be effectively unbound at a region of the preparatory unbinding surface 22.

When the clearance of the preparatory unbinding surface 22 is set to 20 mm, it is possible to unbind the noodles to a substantially same degree to that attained by the unbinding surface without the preparatory unbinding surface. Therefore, when the clearance of the preparatory unbinding surface 22 is set to a value within a range of 10 mm to 15 mm, the preparatory unbinding surface 22 can perform the effective unbinding performance. That is to say, by providing the preparatory unbinding surface 22 with a suitable clearance, the unbinding time period can be prolonged, and therefore a mass of noodles can be unbound much more effectively.

It should be noted that the preparatory unbinding surface 22 may be equally provided in the embodiments 1 to 4.

In the embodiments so far explained, the unbinding surface 17 is curved along an arc which is concentric to a circle drawn by the tips 13a, 18a, 20a and 21a of the unbinding rods 13, unbinding plates 18 and unbinding ridges 20. However, according to the invention, it is not always necessary to form the unbinding surface along the concentric circle. According to the invention, a mass of noodles is unbound by the unbinding member most efficiently in a region near the entrance 17a of the unbinding surface 17, i.e. a boundary region between the unbinding surface 17 and the inlet 15 or a boundary region between the unbinding surface 17 and the preparatory unbinding surface 22. Therefore, it is sufficient to provide the entrance 17a of the unbinding surface 17 with a suitable clearance with respect to the unbinding member for attaining the efficient unbinding function. Then, a lower portion of the unbinding surface 17 may be separated from the unbinding member to avoid possible contact with the unbinding member. In this case, the unbinding surface 17 may be formed along an arc whose center is shifted from a center of the circle drawn by the tip of the unbinding member.

Furthermore, it is not always necessary to provide the unbinding surface 17 and preparatory unbinding surface 22 along a circular arc as long as a suitable clearance for attaining the effective unbinding is formed with respect to the unbinding member. Moreover, the lower inner wall surface 14 situating below the unbinding surface 17 and preparatory unbinding surface 22 may be formed in any shape as long as an unbound mass of noodles can by smoothly discharged.

EXPLANATION OF THE REFERENCE NUMERALS 11 housing
12 rotating shaft
13 unbinding rod
14 inner wall surface
15 inlet
16 outlet
17 unbinding surface
18 unbinding plate
19 rotating drum
20 unbinding projection
21 unbinding ridge
22 preparatory unbinding surface

What is claimed is:

1. An apparatus for unbinding a mass of mutually sticked noodles comprising:
 a housing having an upper inlet and a lower outlet provided underneath the inlet,
 a rotating member arranged horizontally within said housing underneath said inlet and being rotated by a driving member, and
 a noodle unbinding member secured to said rotating member to extend in a radial direction,
 wherein said housing includes an unbinding inner wall surface that extends from said upper inlet to a horizontal level passing through a center of said rotating member such that an unbinding angle, over which the unbinding inner wall surface extends from the horizontal level to an entrance of the unbinding inner wall surface located near said upper inlet, is between 45° and 90°, wherein the unbinding inner wall surface extends substantially along a curved surface which has a radius larger than a radius of a circle drawn by a locus of a rotating tip of said unbinding member rotated by said rotating member, and
 wherein at least the entrance of said unbinding inner wall surface is situated close to said circle drawn by the locus of the rotating tip of said unbinding member rotated by said rotating member such that the mass of mutually sticked noodles charged into the housing from the upper inlet is unbound by being repeatedly hit against said unbinding inner wall surface in a region near said entrance of the unbinding inner wall surface.

2. The apparatus according to claim 1, wherein said rotating member includes a rotating shaft and said unbinding member is secured to said rotating shaft.

3. The apparatus according to claim 1, wherein said rotating member includes a rotating drum and said unbinding member is secured to a surface of said rotating drum.

4. The apparatus according to claim 1, wherein said entrance of the unbinding inner wall surface is aligned with a lower end of said inlet.

5. The apparatus according to claim 1, wherein a clearance between said unbinding inner wall surface and the tip of the unbinding member is set to be between 4 mm and 5 mm.

6. The apparatus according to claim 1, wherein a circular arc of the curved surface of the unbinding inner wall surface is a concentric circle to said circle drawn by the rotating tip of the unbinding member.

7. The apparatus according to claim 1, wherein the mass of mutually sticked noodles charged into the housing is a serving for one meal, and wherein said unbinding member hits said mass of mutually sticked noodles from ten to several tens of times.

8. The apparatus according to claim 1, wherein a preparatory unbinding surface is provided between the entrance of the unbinding inner wall surface and the inlet, and wherein a clearance between the preparatory unbinding surface and the unbinding member is larger than a clearance between the unbinding inner wall surface and the unbinding member.

9. The apparatus according to claim 1, wherein a plurality of said unbinding members are secured to said rotating member at positions which are separated from each other by an equal angle viewed in a rotational direction of the rotating member.

10. The apparatus according to claim 1, wherein said tip of the unbinding member is formed to have a semicircular cross sectional shape.

11. The apparatus according to claim 1, wherein said unbinding member is bent to project toward a rotational direction of the unbinding member.

12. The apparatus according to claim 1, wherein said unbinding member includes a plurality of unbinding rods each having a circular cross section, and said unbinding rods are secured to said rotating member and are aligned in an axial direction of the rotating member to form a comb.

13. The apparatus according to claim 1, wherein said unbinding member includes a plate-like body secured to a surface of the rotating member.

14. The apparatus according to claim 1, wherein said unbinding member includes a ridge secured to a surface of the rotating member.

15. The apparatus according to claim 1, wherein the mass of mutually sticked noodles charged into the housing is a serving for one meal.

16. The apparatus according to claim 1, wherein the mass of mutually sticked noodles charged into the housing has a weight of approximately 100 grams.

* * * * *